Nov. 13, 1962  E. G. V. FERMSKOG  3,063,205
GRINDERS FOR SAW-BLADES
Filed April 13, 1959

# United States Patent Office 3,063,205
Patented Nov. 13, 1962

3,063,205
GRINDERS FOR SAW-BLADES
Ernst Gustav Valdemar Fermskog, Lenhovda, Sweden
Filed Apr. 13, 1959, Ser. No. 805,808
1 Claim. (Cl. 51—156)

This invention relates to an apparatus for circular grinding or turning of a circular saw-blade mounted for rotation on a supporting structure (not shown). The grinding tool can be moved against and away from the saw-blade by a screw means, and also it can be moved transversely to said screw blade by sliding means in a direction normal to the first mentioned movement. When the saw-blade is rotating, it is possible to execute the grinding with the highest possible precision. Only one hand is necessary to guide the apparatus in both the mentioned movements. The other hand can therefore be used to press the apparatus against the stop face of the saw table.

Figure 1:
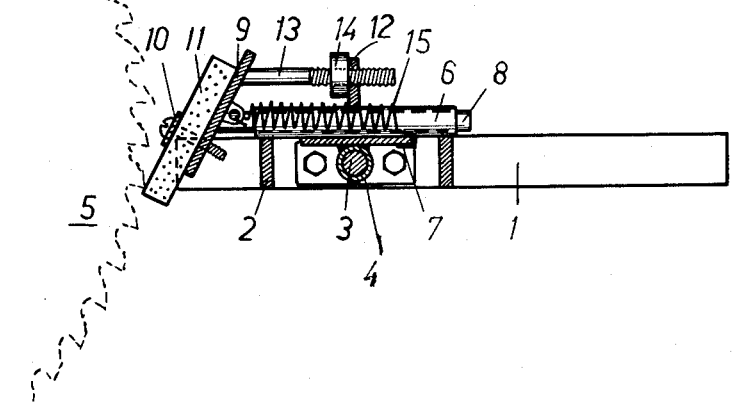
Figure 2:
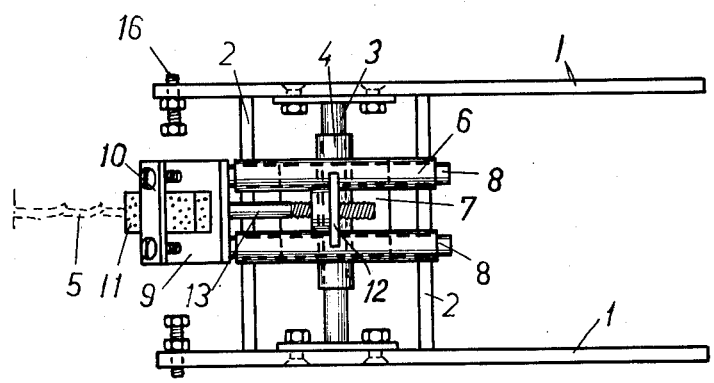

The invention shall be described by way of example in terms an embodiment which is shown in the accompanying drawing, in which FIG. 1 shows a longitudinal section of the apparatus, while FIG. 2 shows a plan view of the apparatus.

The grinder comprises a base having longitudinal and transverse axes, a carriage longitudinally and transversely movable with respect to the base, and a tool carrier, to which a grinding tool is secured, carried by said carriage. The base comprises two bars 1, parallel and fixed to each other by two rods 2. Between the bars and approximately parallel to the rods is placed an axle 3, over which a sleeve 4 is slidably mounted. This sleeve supports the carriage 7, on the upper side of which two tubes 6 are fixed. The tubes are parallel to said bars 1 and to each other and are placed normal to the axle 3. In the tubes are slidably mounted two guides 8, having two adjacent ends fixed to a common tool holder 9, the upper side of which is provided with a gripping jaw 10 for securing a grinding tool 11 to the tool holder. The latter is suitably placed in an angle against the saw-blade in order to apply the largest possible grinding surface to the saw-blade. On the back of the gripping jaw is fixed one end of a nonrotatable axle 13, the other end of which is threaded and provided with a jamb nut 14. The threaded part of the axle 13 is passed through a hole in a support 12, which is fixed to the upper side of the carriage. Between the tool holder and the carriage is placed a tension spring 15, biasing the tool holder 9, toward the carriage, the guides 8 telescoping in the tubes 6 until stopped by the jamb nut bearing against the support 12. Rotating the jamb nut 14 around the engaged and threaded part of the axle 13 advances and retracts the axle and the attached tool holder 9 with the grinding tool 11 fastened thereto.

When the grinder is used, it is placed adjacent the supporting structure of the saw and the base is longitudinally aligned with the saw-blade by the set screws 16 so that the grinding tool 11 is placed in the desired alignment with the saw-blade 5. By using the jamb nut 14 the grinding tool is longitudinally moved against the saw-blade at the same time as the bearing 4 is transversely moved from side to side along the axle 3. These movements can be made by, for example, the right hand, while the left hand is used to press the apparatus against the stop face. The saw-blade is rotating and will therefore be turned round gradually as the grinding tool is screwed forward. The carriage cannot rotate on the axle because the under side of the tubes 6 are supported on the upper side of the rods 2.

Having now fully described my said invention, what I claim and desire to secure by Letters Patent is:

A grinder for grinding a circular saw blade that is mounted for rotation on a saw table, comprising; an elongated frame base having two longitudinal parallel frame members and two parallel transverse frame members for supporting the grinder, oppositely disposed set screws transversely mounted at an end of said frame base for aligning said grinder with the saw blade, a transverse axle connected to the longitudinal frame members intermediate the transverse frame members, a sleeve slidably mounted on said transverse axle and movable transversely between longitudinal frame members, a carriage supported by said sleeve intermediate said frame members, two tubes fastened to said carriage oppositely disposed therefrom and normal to said sleeve, said tubes spaced symmetrically and transversely from said longitudinal members and having their respective ends slidably supported for transverse movement by said transverse frame members, an elongated guide member slidably mounted for longitudinal movement in each of said tubes, a tool holder fastened to two adjacent ends of said guide members, an abrasive tool mounted in said tool holder for grinding the saw blade, a nonrotatable longitudinal axle attached by an end to said tool holder intermediate the attached guide member ends, said axle having an exterior threaded portion at the other end, an axle support member fastened to said carriage between the tubes and normal to the transverse and longitudinal axles, said support member defining a hole through which said threaded end of the longitudinal axle extends, a nut engaging the threaded end of said longitudinal axle between the support and the tool holder for providing with said support an adjustable stop for controlling the longitudinal movement of said tool holder and attached slidable guide members, and a tension spring fastened to the tool holder and the carriage for biasing said nut against said support, whereby said saw blade grinder is controllable for movement in two planes, toward and away from said saw blade and transversely thereto.

References Cited in the file of this patent
UNITED STATES PATENTS

| | | |
|---|---|---|
| 298,538 | Wolcott | May 13, 1884 |
| 2,061,842 | Louden | Nov. 24, 1936 |
| 2,617,317 | Oliver | Nov. 11, 1952 |

FOREIGN PATENTS

| | | |
|---|---|---|
| 877,237 | Germany | May 21, 1953 |